United States Patent
Cao et al.

(10) Patent No.: US 11,853,711 B2
(45) Date of Patent: Dec. 26, 2023

(54) TRANSLATION PEN AND TRANSLATION SYSTEM

(71) Applicant: BOE TECHNOLOGY GROUP CO., LTD., Beijing (CN)

(72) Inventors: Shijie Cao, Beijing (CN); Xingqun Jiang, Beijing (CN); Xinxin Mu, Beijing (CN); Hong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 488 days.

(21) Appl. No.: 17/273,806

(22) PCT Filed: Jun. 18, 2020

(86) PCT No.: PCT/CN2020/096734
§ 371 (c)(1),
(2) Date: Mar. 5, 2021

(87) PCT Pub. No.: WO2020/253761
PCT Pub. Date: Dec. 24, 2020

(65) Prior Publication Data
US 2021/0286957 A1 Sep. 16, 2021

(30) Foreign Application Priority Data
Jun. 19, 2019 (CN) .......................... 201910531402.7

(51) Int. Cl.
*G06F 40/58* (2020.01)
*G06T 5/00* (2006.01)
(Continued)

(52) U.S. Cl.
CPC .............. *G06F 40/58* (2020.01); *G06T 5/005* (2013.01); *G06V 30/142* (2022.01); *H04N 23/60* (2023.01)

(58) Field of Classification Search
None
See application file for complete search history.

(56) References Cited

U.S. PATENT DOCUMENTS 7,273,174 B2 * 9/2007 Chiang .............. G06V 30/1423
235/472.01
8,446,298 B2 * 5/2013 Marggraff .............. G11B 25/00
358/1.15
(Continued)

FOREIGN PATENT DOCUMENTS

| CN | 101339617 A | 1/2009 |
| CN | 202771514 U | 3/2013 |

(Continued)

OTHER PUBLICATIONS

PCT International Search Report (w/ English translation) for corresponding PCT Application No. PCT/CN2020/096734, dated Sep. 22, 2020, 5 pages.

(Continued)

*Primary Examiner* — Anand P Bhatnagar
(74) *Attorney, Agent, or Firm* — Dority & Manning, P.A.

(57) ABSTRACT

A translation pen includes: a pen body; and an image collector, a first processor and a second processor that are disposed in the pen body. The image collector, the first processor and the second processor are arranged in sequence in an extending direction from a pen tip to a pen tail of the pen body, and are sequentially coupled to one another. The image collector is configured to collect an image of a target translation object and transmit the image of the target translation object to the first processor. The first processor is configured to preprocess the image of the target translation object and transmit the preprocessed image to the second processor. The second processor is configured to control the image collector to collect the image of the target translation (Continued)

object and control the first processor to preprocess the image of the target translation object.

18 Claims, 14 Drawing Sheets

(51) Int. Cl.
*G06V 30/142* (2022.01)
*H04N 23/60* (2023.01)

(56) References Cited

U.S. PATENT DOCUMENTS

| | | | | |
|---|---|---|---|---|
| 11,567,590 | B2* | 1/2023 | Lee | G06F 3/0386 |
| 2006/0151610 | A1* | 7/2006 | Chiang | G06V 30/1423 |
| | | | | 235/472.03 |
| 2009/0063129 | A1 | 3/2009 | Tsai et al. | |
| 2019/0094996 | A1* | 3/2019 | Kim | G06F 3/0346 |
| 2021/0155030 | A1* | 5/2021 | Kurani | G06F 3/016 |
| 2021/0312824 | A1* | 10/2021 | Song | G09B 5/04 |
| 2022/0261096 | A1* | 8/2022 | Lee | G06F 3/1423 |

FOREIGN PATENT DOCUMENTS

| | | | |
|---|---|---|---|
| CN | 203070566 U | * | 7/2013 |
| CN | 203070566 U | | 7/2013 |
| CN | 104881405 A | | 9/2015 |
| CN | 110245362 A | | 9/2019 |
| WO | WO 97/15896 A1 | | 5/1997 |

OTHER PUBLICATIONS

Chinese First Office Action (w/ English translation) for corresponding Chinese Application No. 201910531402.7, dated Oct. 10, 2022, 14 pages.

* cited by examiner

TRANSLATION PEN AND TRANSLATION SYSTEM

CROSS-REFERENCE TO RELATED APPLICATIONS

This application is a national phase entry under 35 USC 371 of International Patent Application No. PCT/CN2020/096734, filed on Jun. 18, 2020, which claims priority to Chinese Patent Application No. 201910531402.7, filed on Jun. 19, 2019, which are incorporated herein by reference in their entirety.

TECHNICAL FIELD

The present disclosure relates to the technical field of translation apparatuses, and in particular, to a translation pen and a translation system.

BACKGROUND

With the increasing frequency of reading foreign language in people's daily life, people's demand for translation is more and more strong, and people's pursuit for efficiency, convenience and technological sense cannot be met by simply looking up a paper dictionary. As a result, translation apparatuses such as translation pens are produced.

The translation apparatuses, which can obtain words and sentences on paper materials and translate them into a preset language, have become a powerful tool for students and other people to learn or read foreign languages.

SUMMARY

This section provides some embodiments, and other embodiments of the present invention will be described in detail in the detailed description section. This section is not used to show the scope of the invention.

On the one hand, a translation pen is provided, and the translation pen includes a pen body, and an image collector, a first processor and a second processor that are disposed in the pen body. The image collector, the first processor and the second processor are arranged in sequence in an extending direction from a pen tip to a pen tail of the pen body, and are sequentially coupled to one another. The image collector is configured to collect an image of a target translation object and transmit the image of the target translation object to the first processor. The first processor is configured to preprocess the image of the target translation object and transmit the preprocessed image to the second processor. The second processor is configured to control the image collector to collect the image of the target translation object and control the first processor to preprocess the image of the target translation object.

In some embodiments, an inner diameter of the pen tip is less than an inner diameter of the pen tail. The image collector is disposed in the pen tip. The second processor is disposed in the pen body and is closer to the pen tail than the image collector. The first processor is disposed in the pen body and is located between the image collector and the second processor.

In some embodiments, the first processor has a mobile industry processor interface (MIPI) and a low voltage differential signaling (LVDS) interface. The image collector is coupled to the first processor through the MIPI interface. The second processor is coupled to the first processor through the LVDS interface.

In some embodiments, the first processor includes one of a field programmable gate array device, a digital signal processor, and an application specific integrated circuit chip.

In some embodiments, the translation pen further includes a communication device disposed in the pen body, and the communication device is coupled to the second processor. Wherein the second processor is further configured to control the communication device to transmit the preprocessed image to a terminal device outside the translation pen. The communication device is configured to transmit the preprocessed image to the terminal device under control of the second processor, so that the terminal device translates texts contained in the preprocessed image.

In some embodiments, the communication device is provided separately from the second processor. In the extending direction from the pen tip to the pen tail of the pen body, the communication device is disposed at a side of the second processor proximate to or away from the pen tail. Or the communication device is provided integrally with the second processor.

In some embodiments, the communication device includes an interface for coupling the terminal device. Or the communication device includes a Wi-Fi circuit or a bluetooth circuit.

In some embodiments, the first processor is in a shape of a cuboid, and side lengths thereof are in a range from 6 mm to 10 mm. The second processor is in a shape of a cuboid, and side lengths thereof are in a range from 8 mm to 12 mm.

In some embodiments, a length of the pen body is in a range from 128 mm to 132 mm in the extending direction from the pen tip to the pen tail of the pen body. An inner diameter of the pen tip is in a range from 8 mm to 12 mm, and an inner diameter of the pen tail is in a range from 13 mm to 17 mm.

In some embodiments, the translation pen further includes a power supply and a memory which are disposed in the pen body. The power supply and the memory are both coupled to the second processor.

In some embodiments, the translation pen further includes a circuit board disposed in the pen body. Wherein the circuit board is in a strip shape, and an extending direction of the strip shape is in the extending direction from the pen tip to the pen tail of the pen body. The first processor and the second processor are disposed on the circuit board.

In some embodiments, the first processor is configured to perform at least one of: performing tilt distortion correction on the image of the target translation object; determining a target area where the target translation object is located in the image of the target translation object and a blank area around the target area, and removing the blank area; determining a redundant object around the target translation object in the image of the target translation object, and removing the redundant object; determining a definition of the image of the target translation object; determining whether the definition meets an image definition required by text recognition of the target translation object in the image; and if not, sending a signal for recollecting an image of the target translation object; and the target translation object being a sentence which includes a plurality of sub-translation objects, preprocessing images of the plurality of sub-translation objects in the sentence to be translated that are collected by the image collector, and performing splicing processing on the preprocessed images.

On the other hand, a translation system is provided, and the translation system includes the translation pen as described in any of the above embodiments, and a terminal device wirelessly or wiredly coupled to the translation pen.

The terminal device is configured to perform text recognition on the target translation object in the preprocessed image from the translation pen and translate the recognized text into a preset language text.

BRIEF DESCRIPTION OF THE DRAWINGS

In order to describe technical solutions in the present disclosure more clearly, the accompanying drawings used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Technical solutions in some embodiments of the present disclosure will be described clearly and completely with reference to the drawings below. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, the term "comprise" and other forms thereof such as the third-person singular form "comprises" and the present participle form "comprising" throughout the description and the claims are construed as an open and inclusive meaning, i.e., "included, but not limited to". In the description of the specification, the terms such as "one embodiment", "some embodiments", "exemplary embodiments", "example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

In addition, the terms "first" and "second" are for illustration purposes only and are not to be construed as indicating or implying relative importance or implied reference to the quantity of indicated technical features. Thus, features defined by "first", "second" and "third" may explicitly or implicitly include one or more of the features.

The expression "at least one of A, B or C" includes the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

Figure 1:
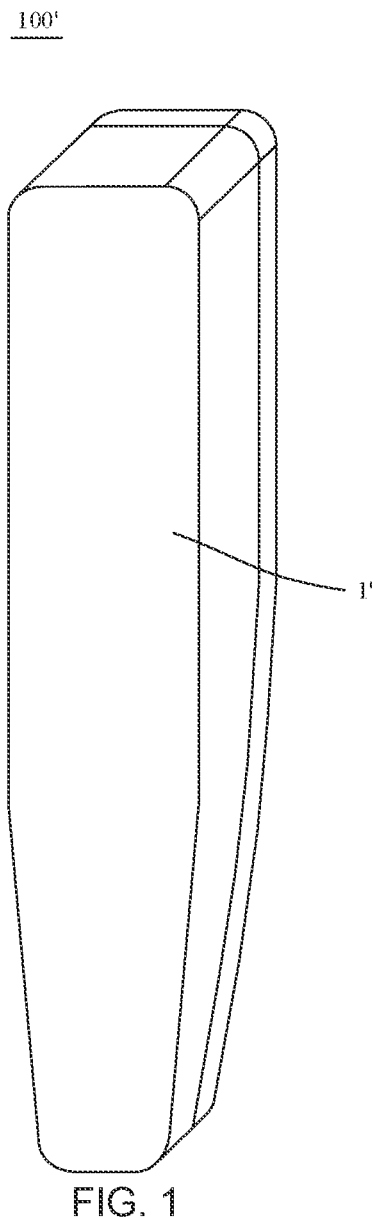
FIG. 1 is a structural diagram of a translation pen in the related art.
Figure 2:
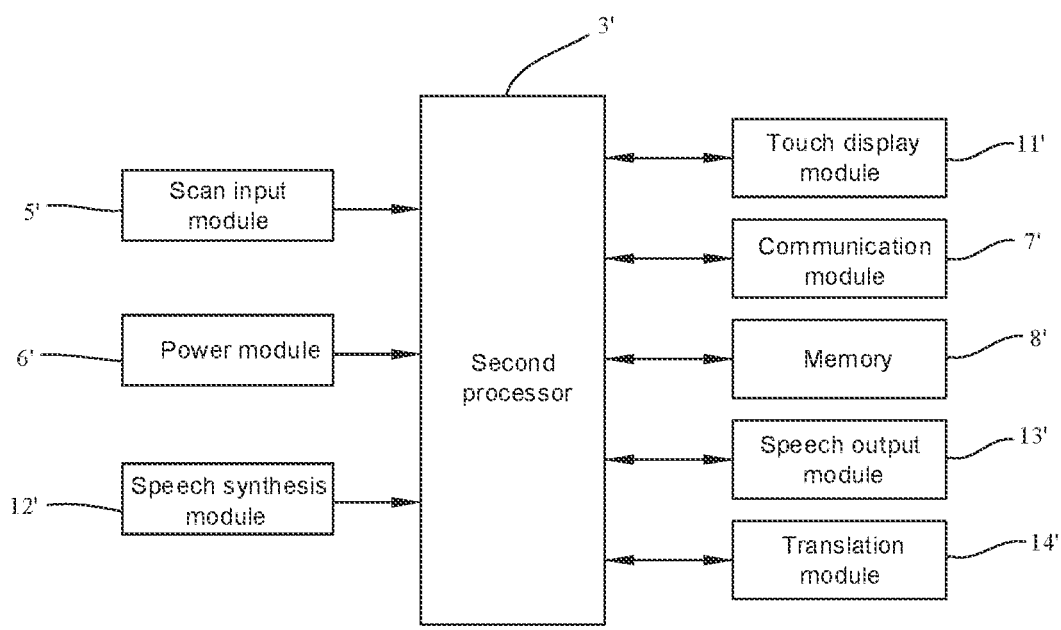
FIG. 2 is a block diagram of the translation pen in FIG. 1.

In the related art, as shown in FIGS. 1 and 2, a translation pen 100' generally includes a pen body 1', and a second processor 3', a scan input module 5', a power module 6', a communication module 7', a memory 8', a touch display module 11', a speech synthesis module 12', a speech output module 13' and a translation module 14' which are all disposed in the pen body 1' of the translation pen 100'.

The second processor 3' performs image processing on an image of a target translation object collected by the scan input module 5'. In addition, the second processor 3' further processes input information of other modules (such as the power module 6', the communication module 7', the touch display module 11', etc.). A volume of the pen body 1' of the translation pen 100' is relatively large due to a large encapsulation volume of the second processor 3'.

Figure 3:
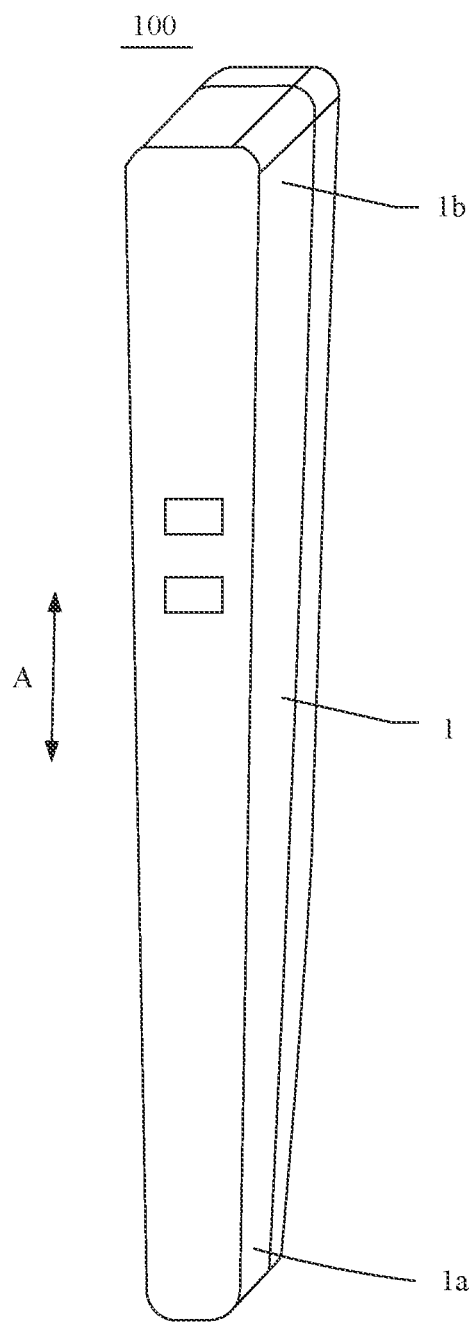
FIG. 3 is a structural diagram of a translation pen, in accordance with some embodiments of the present disclosure.
Figure 4A:
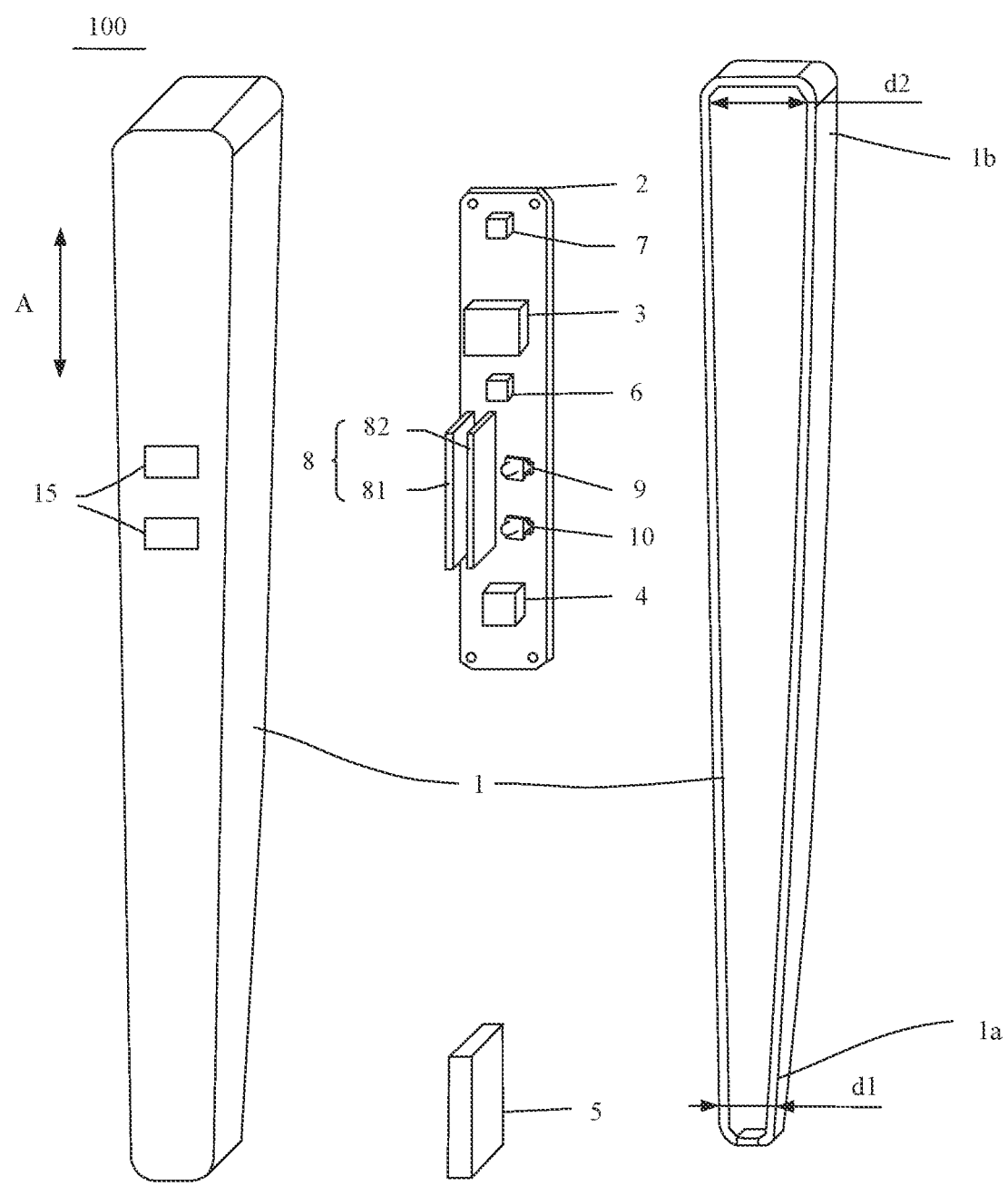
FIG. 4A is an exploded view of the translation pen in FIG. 3.
Figure 6:
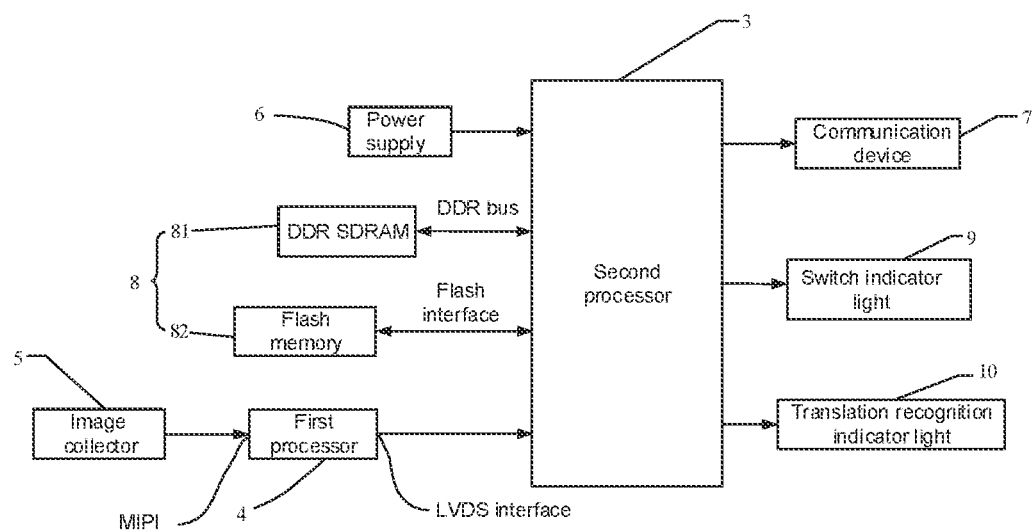
FIG. 6 is a block diagram of a translation pen, in accordance with some embodiments of the present disclosure.

Some embodiments of the present disclosure provide a translation pen. As shown in FIGS. 3, 4A and 6, the translation pen 100 includes a pen body 1 for encapsulation, and an image collector 5, a first processor 4 and a second processor 3 that are disposed in the pen body 1. The image collector 5, the first processor 4 and the second processor 3 are arranged in sequence in an extending direction from a pen tip 1*a* to a pen tail 1*b* of the pen body 1, and are sequentially coupled to one another.

Figure 16:
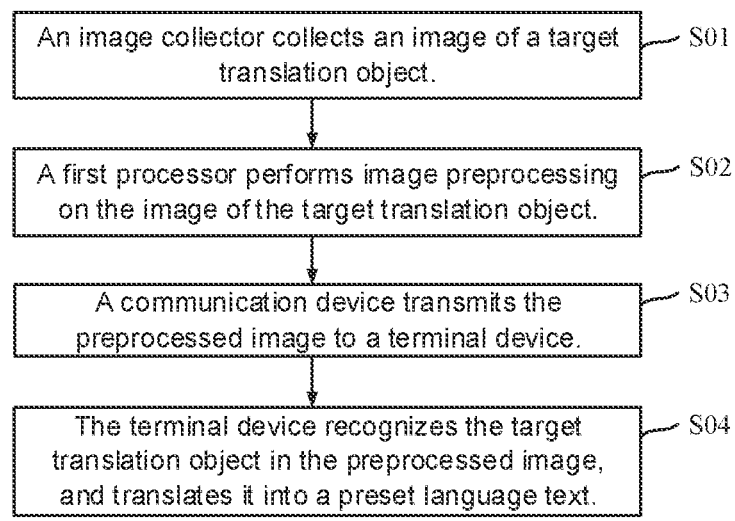
FIG. 16 is a schematic diagram illustrating operation of a translation system, in accordance with some embodiments of the present disclosure.

Referring to FIG. 16, the image collector 5 is configured to collect an image of a target translation object and transmit the collected image of the target translation object to the first processor 4.

The first processor 4 is configured to preprocess the image of the target translation object and transmit the preprocessed image to the second processor 3.

The second processor 3 is configured to control components within the translator pen 100. For example, the second processor 3 is configured to control the image collector 5 to: collect the image of the target translation object and transmit the preprocessed image to the first processor 4; and the second processor 3 is further configured to control the first processor 4 to: preprocess the image of the target translation object and transmit the preprocessed image to the second processor 3.

It will be noted that the above preprocessing may include, for example, preprocessing operations such as tilt distortion correction, blank area removal, redundant object removal, intelligent prejudgment, and splicing processing, which will be exemplarily described hereinafter.

In the translation pen 100 provided by the above embodiments of the present disclosure, as for the first processor 4 and the second processor 3, the first processor 4 is utilized for preprocessing an image, and the second processor 3 is utilized for controlling operations of the components (e.g., the image collector 5 and the first processor 4) in the translation pen 100, so that there is no need to integrate the image preprocessing and the control operations of the components into a same processor, which reduces a volume of a single processor (e.g., the second processor 3). In addition, the first processor 4 and the second processor 3 are arranged in sequence in the extending direction A from the pen tip 1*a* to the pen tail 1*b* of the pen body 1, and thus there is no need to occupy a large radial space (a space in a direction perpendicular to the extending direction A) in the pen body of the translation pen 100, and a longitudinal space (a space in the extending direction A) in the pen body is fully utilized, so that a volume of the translation pen 100 is reduced.

Figure 5:
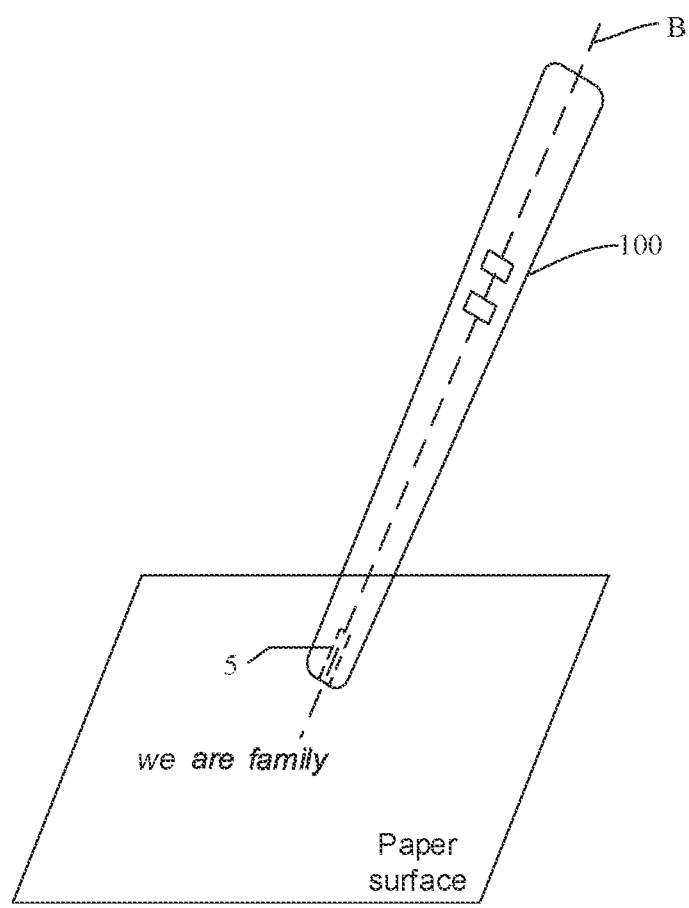
FIG. 5 is a schematic diagram illustrating operation of a translation pen, in accordance with some embodiments of the present disclosure.

It will be noted that, as shown in FIG. 5, the target translation object is a word directly facing an optical axis B of a lens of the image collector 5. For example, to translate the word "family" in the sentence "we are family," the optical axis of the lens of the image collector 5 needs to directly face the word "family" which is the target translation object.

For example, the pen body 1 of the translation pen 100 is in a strip shape, and the pen body 1 includes two ends in which one end is the pen tip 1*a* of the pen body 1, and the other end is the pen tail 1*b* of the pen body 1. The image collector 5, the first processor 4 and the second processor 3 are sequentially arranged spaced apart from one another in the extending direction A from the pen tip 1*a* to the pen tail 1*b* of the strip-shaped pen body 1. The image collector 5 is inside the pen tip 1*a* of the pen body 1, and the pen body 1 is provided with a through hole at the pen tip 1*a*, which exposes an end of the image collector 5 (i.e., an end with the lens), so that the image collector 5 collects the image of the target translation object.

The first processor 4 is provided separately from the second processor 3 in a manner that the image collector 5, the first processor 4 and the second processor 3 are sequentially arranged spaced apart from one another in the extending direction A from the pen tip 1*a* to the pen tail 1*b* of the pen body 1, so that an inner diameter of the pen body 1 is reduced, and an overall miniaturization design of the translation pen 100 is realized.

In some embodiments, the first processor 4 is provided separately from the second processor 3, and the first processor 4 and the second processor 3 are individually encapsulated, which reduces an encapsulation volume of the second processor 3, so that it is more conducive to realization of the overall miniaturization design of the translation pen 100.

Figure 17:
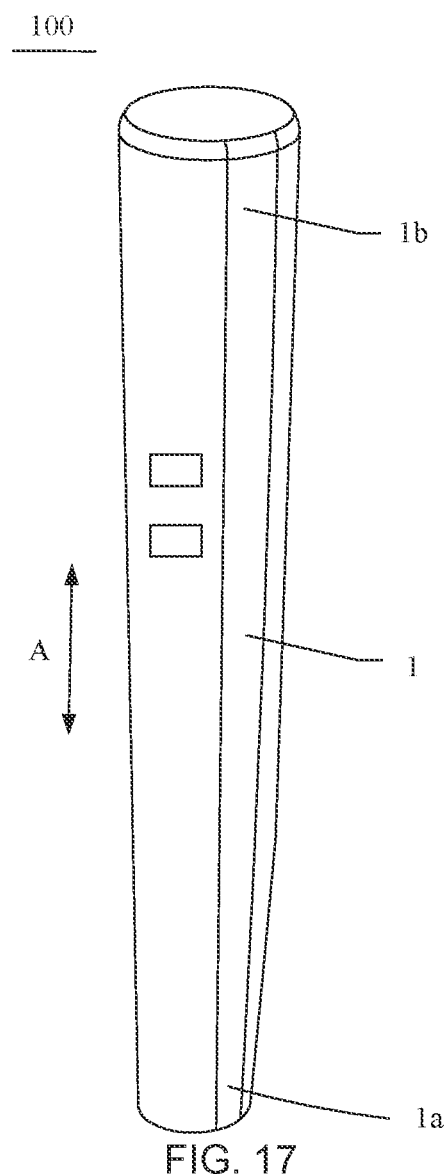
FIG. 17 is a structural diagram of a translation pen, in accordance with some embodiments of the present disclosure.

In some embodiments, as shown in FIG. 17, an inner diameter of the pen tip 1*a* of the pen body 1 is less than an inner diameter of the pen tail 1*b*, or as shown in FIGS. 3 and 4A, a distance between two opposite inner sides of the pen tip 1*a* of the pen body 1 is less than a distance between two opposite inner sides of the pen tail 1*b* in a same direction. Encapsulation volumes of the image collector 5, the first processor 4 and the second processor 3 are sequentially increased. The image collector 5 is disposed in the pen tip 1*a* of the pen body 1, and the pen body 1 is provided with a through hole at the pen tip 1*a*, which exposes the end with the lens of the image collector 5, so that the image collector 5 collects the image of the target translation object. The second processor 3 is disposed in the pen body 1, and is closer to the pen tail 1*b* of the pen body 1 than the image collector 5. The first processor 4 is disposed in the pen body 1 and is located between the image collector 5 and the second processor 3.

For example, the inner diameter of the pen tip 1*a* of the pen body 1 is d1, and the inner diameter of the pen tail 1*b* of the pen body 1 is d2, and d1 is less than d2. In the extending direction A from the pen tip 1*a* to the pen tail 1*b* of the pen body 1, the inner diameter of the pen body 1 is gradually increased from the pen tip 1*a* to the pen tail 1*b*.

For example, an encapsulation volume of the first processor 4 is larger than an encapsulation volume of the image collector 5, and the encapsulation volume of the second processor 3 is larger than the encapsulation volume of the first processor 4. In order to realize the overall miniaturization design of the translation pen 100, the pen body 1 is arranged such that the inner diameter of the pen tip 1*a* is less than the inner diameter of the pen tail 1*b*, and the inner diameter of the pen body 1 is gradually increased from the pen tip 1*a* to the pen tail 1*b*. The image collector 5 with the smallest encapsulation volume is disposed in the pen tip 1*a* of the pen body 1.

The second processor 3 with the largest encapsulation volume is arranged in the pen body 1, and is closer to the pen tail 1*b* of the pen body 1 than the image collector 5. The first processor 4 with an encapsulation volume between the encapsulation volume of the image collector 5 and the encapsulation volume of the second processor 3 is provided between the image collector 5 and the second processor 3. Through the above arrangement manner, the arrangement of the image collector 5, the first processor 4 and the second processor 3 in the pen body 1 is more compact, which improves a utilization rate of space in the pen body 1, and thus it is beneficial to realize the overall miniaturization design of the translation pen 100.

For example, the image collector 5 is a miniature camera, and a length, a height and a width of the miniature camera are in a range from 2.4 mm to 2.8 mm, 3.1 mm to 3.5 mm, and 2.12 mm to 2.52 mm, respectively. For example, the length of the miniature camera may be 2.4 mm, 2.6 mm or 2.8 mm, the height of the miniature camera may be 3.1 mm, 3.3 mm or 3.5 mm, and the width of the miniature camera may be 2.12 mm, 2.32 mm or 2.52 mm.

A too large or too small viewable angle of the image collector 5 may cause problems that when an operator uses the translation pen 100 to collect text images on a paper surface, the images collected by the image collector 5 are incomplete, unclear and the like, and even the images cannot be effectively obtained, thereby affecting the accuracy of translation. For example, an angle range of the viewable angle of the image collector 5 is 30° to 40°, e.g., 30°, 31°, 35° or 40°, so as to improve integrity and definition of the image collected by the image collector 5.

For example, an image collected by the image collector 5 is in a shape of a rectangle, and a length and a width of the rectangular image are in a range from 28 mm to 32 mm, and 28 mm to 32 mm, respectively. For example, the length of the rectangular image may be 28 mm, 30 mm or 32 mm, and the width of the rectangular image may be 28 mm, 30 mm or 32 mm.

For example, the first processor 4 may be one of a field programmable gate array (abbreviated as FPGA) device, a digital signal processor (abbreviated as DSP), or an application specific integrated circuit (abbreviated as ASIC) chip and the like. The first processor 4 is in a shape of a cuboid, and side lengths thereof are in a range from 6 mm to 10 mm, e.g., 7 mm, 8 mm or 9 mm.

In some embodiments, the first processor 4 may be the FPGA device, and the first processor 4 may perform high frame rate processing (processing 60 frames per second) on the image of the target translation object, so that the translation pen 100 may realize fast scanning without losing the image during a translation process, thereby ensuring fast and accurate translation process. In addition, the FPGA device may perform any two or more of preprocessing operations such as tilt distortion correction, blank area removal, redundant object removal, intelligent prejudgment, splicing processing and the like simultaneously, and complete a processing feedback within 60 milliseconds, which improves processing efficiency of the image of the target translation object, thereby ensuring speed of translation. In addition, the FPGA device has advantages of small volume and light weight, which is beneficial to reducing the volume of the translation pen 100.

The first processor 4 may be the digital signal processor, so that the first processor 4 has characteristics of high reliability, good versatility, good replaceability, low cost, high flexibility and the like, which is beneficial to improving operational reliability of the translation pen 100 and reducing cost of the translation pen 100.

The first processor 4 may be the ASIC chip, so that the first processor 4 has characteristics of small volume and light weight, which is beneficial to reducing the volume of the translation pen 100. In addition, after the ASIC chip is integrated into a system, the number of its external connections is reduced, and its reliability is significantly improved, thereby improving operational reliability of the translation pen 100.

For example, the second processor 3 may be an advanced RISC machine (ARM, which is a RISC microprocessor) chip, which has characteristics of small volume, low power consumption, low cost, high performance and the like. The ARM chip is configured to control the image collector 5 to: collect the image of the target translation object and transmit the preprocessed image to the first processor 4; the ARM chip is further configured to control the first processor 4 to: preprocess the image of the target translation object and transmit the preprocessed image to the ARM chip. The ARM chip is in a shape of a cuboid, and its side lengths are in a range from 8 mm to 12 mm, e.g., 8 mm, 10 mm or 12 mm.

For example, in the extending direction A from the pen tip 1*a* to the pen tail 1*b* of the pen body 1, a length of the pen body 1 is in a range from 128 mm to 132 mm. For example, it may be 128 mm, 130 mm or 132 mm. An inner diameter d1 of the pen tip 1*a* of the pen body 1 is in a range from 8 mm to 12 mm, and an inner diameter d2 of the pen tail 1*b* of the pen body 1 is in a range from 13 mm to 17 mm. For example, the inner diameter d1 of the pen tip 1*a* may be 8 mm, 10 mm or 12 mm, and the inner diameter d2 of the pen tail 1*b* may be 13 mm, 15 mm or 17 mm.

In some embodiments, as shown in FIG. 6, the first processor 4 has a mobile industry processor interface (MIPI) and a low voltage differential signaling (LVDS) interface.

The image collector 5 is coupled to the first processor 4 through the MIPI interface of the first processor 4, so that the image collector 5 may transmit the collected image of the target translation object to the first processor 4 through the MIPI interface. The MIPI interface may improve the consistency of interface between the image collector 5 and the first processor 4.

The second processor 3 is coupled to the first processor 4 through the LVDS interface of the first processor 4, so that the first processor 4 may transmit the preprocessed image of the target translation object to the second processor 3 through the LVDS interface. The LVDS interface (also known as RS-644 bus interface) is a transmission interface for digital video signals, which adopts a low-voltage and low-current driving manner to achieve a low-noise and low-power-consumption transmission between the first processor 4 and the second processor 3.

Figure 7:
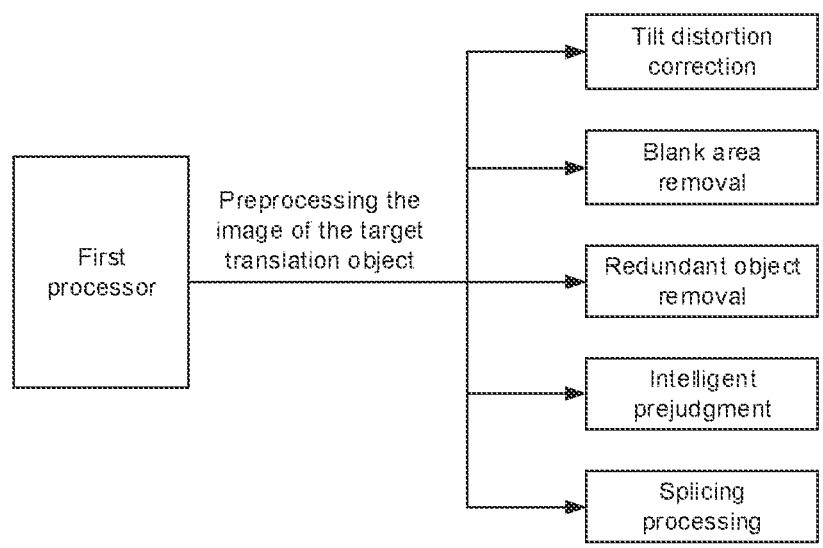
FIG. 7 is a schematic diagram illustrating preprocessing performed by a first processor of a translation pen, in accordance with some embodiments of the present disclosure.

In some embodiments, as shown in FIG. 7, the first processor 4 is configured to perform at least one of the following preprocessing operations.

I. tilt distortion correction: the tilt distortion correction is performed on the image of the target translation object.

Figure 8:
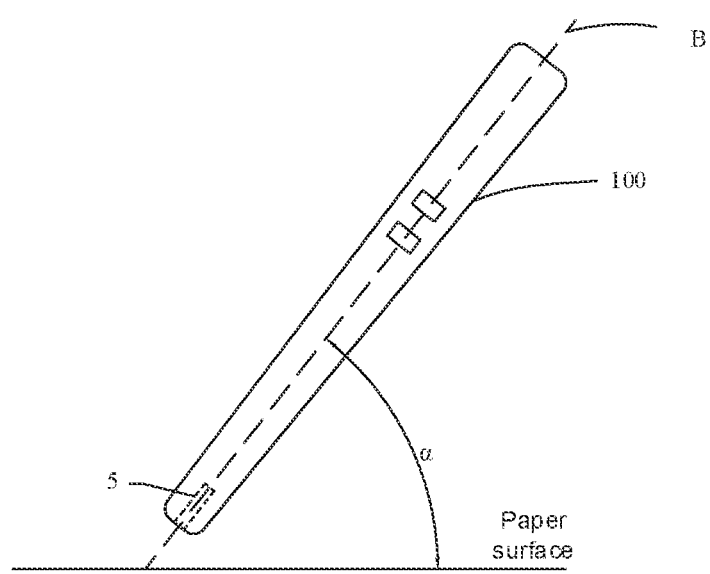
FIGS. 8 to 10 are schematic diagrams illustrating tilt distortion correction performed by a first processor of a translation pen, in accordance with some embodiments of the present disclosure.
Figure 9:
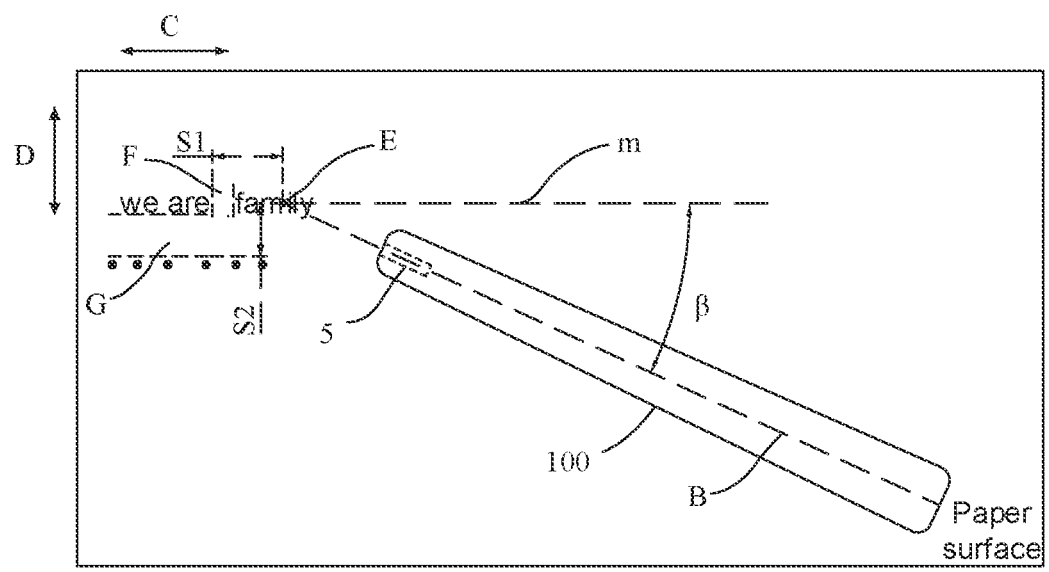
Figure 10:
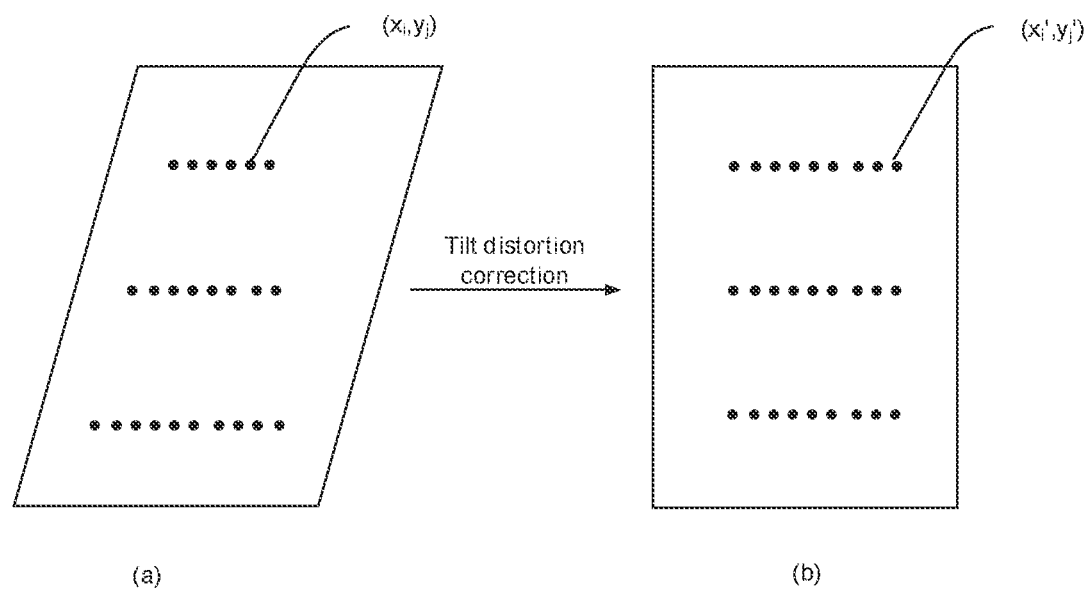

For example, as shown in FIGS. 8 to 10, when the image collector 5 of the translation pen 100 collects an image of the target translation object, the operator may slant the translation pen 100, and then the target translation object in the image collected by the image collector 5 of the translation pen 100 may be distorted to a certain extent. The distorted image is as shown in (a) of FIG. 10, which may have a certain effect on the speed and accuracy of subsequent image recognition.

In order to eliminate this effect, the first processor 4 is configured to perform image preprocessing of tilt distortion correction, i.e., perform image distortion correction on the image of the target translation object. The first processor 4 performs the image distortion correction on the image of the target translation object, which may eliminate a problem that the target translation object in the image is distorted due to improper placement of the translation pen 100, thereby avoiding affecting the speed and accuracy of subsequent image recognition, making the translation pen 100 keep a high recognition speed and accuracy, and further improving the translation speed and accuracy.

Figure 11:
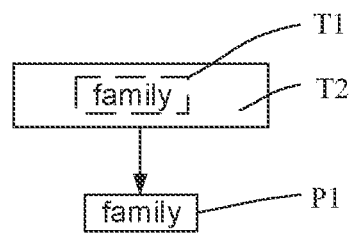
FIG. 11 is a schematic diagram illustrating removal of a blank area performed by a first processor of a translation pen, in accordance with some embodiments of the present disclosure.

For example, performing, by the first processor 4, distortion correction on the image of the target translation object, includes: as shown in FIGS. 9 to 11, setting an inclination angle of the optical axis B of the lens of the image collector 5 in the translation pen 100 with respect to the paper surface to be α, and an included angle between a projection of the optical axis B of the lens of the image collector 5 on the paper surface and a first plane m to be β.

The first plane m is a plane that is perpendicular to the paper surface and parallel to a row direction C of the texts on the paper surface. A matrix of coordinates of all pixels of the target translation object in the collected image is [X, Y], and the matrix includes n by m points; n represents the number of rows of points in the matrix, and m represents the number of columns of points in the matrix: n is a positive integer greater than or equal to 1, and m is a positive integer greater than or equal to 1.

Coordinates of a point in the above matrix are $(x_i, y_j)$, a value of i is sequentially taken from a positive integer set of [1~m], and a value of j is sequentially taken from a positive integer set of [1~n]. The first processor 4 performs tilt processing on coordinates of each pixel, and the processing process is: when $0<\alpha<90°$ and $0<\beta<90°$, $$x'_i = \frac{x_i}{\cos\alpha \times \cos\beta} \text{ and } y'_j = \frac{y_j}{\cos\alpha \times \sin\beta};$$

when $0<\alpha<90°$ and $\beta=0°$, $$x'_i = \frac{x_i}{\cos\alpha}$$

and $y'_j=y_j$; when $0<\alpha<90°$ and $\beta=90°$, $x'_i=x_i$ and $$y'_j = \frac{y_j}{\cos\alpha}.$$

II. blank area removal: a target area where the target translation object is located in the image of the target translation object and a blank area around the target area are determined, and the blank area is removed.

For example, as shown in FIG. 11, an image of the target translation object "family" includes a target area T1 where the target translation object "family" is located and a blank area T2 around the target area T1. In order to improve the speed and accuracy of translation, the first processor 4 may be configured to perform the following image preprocessing, i.e., remove the blank area T2 in the image of the target translation object "family" to form a first processed image P1. The first processor 4 extracts the target area T1 where the target translation object "family" is located by removing the blank area T2 in the image of the target translation object "family", and in subsequent recognition and translation, the blank area T2 may be prevented from interfering with the recognition and translation, thereby improving the speed and accuracy of translation.

For example, the first processor 4 may remove the blank area T2 by adopting the following method: performing binarization processing to the image of the target translation object "family", and determining the target area T1 where the target translation object "family" is located and the blank area T2 according to a gray value of each area in the image of the target translation object "family", and then removing the blank area T2 to form the first processed image P1. The first processor 4 distinguishes the target area T1 where the target translation object "family" is located from the blank area T2 through a difference between gray values of the target area T1 and the blank area T2, and removes the blank area T2 by comparing the gray values. This algorithm is simple, so that it is beneficial for the first processor 4 to accurately remove the blank area T2.

The target area T1 where the target translation object "family" is located and the blank area T2 may be determined by adopting the following method: determining an area in the image of the target translation object "family" whose gray value is greater than a gray threshold as the target area T1 where the target translation object "family" is located, and determining an area in the image of the target translation object "family" whose gray value is less than the gray threshold as the blank area T2. The gray threshold may be set to half of a sum of the maximum value and the minimum value of the gray values in the image of the target translation object "family".

III. redundant object removal: a redundant object around the target translation object in the image of the target translation object is determined, and the redundant object is removed.

Figure 12:
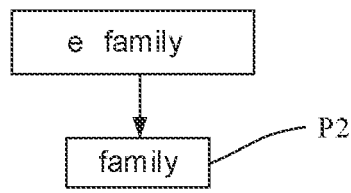
FIG. 12 is a schematic diagram illustrating removal of a redundant object performed by a first processor of a translation pen, in accordance with some embodiments of the present disclosure.

For example, as shown in FIG. 12, in order to improve the speed and accuracy of translation, the first processor 4 is further configured to perform the following image preprocessing, i.e., if the collected image of the target translation object has a redundant object, remove the redundant object around the target translation object "family" in the image to form a second processed image P2.

For example, when the translation pen 100 translates "family" in "we are family" into Chinese, and the collected image of the target translation object, such as "e family", has a redundant object, the first processor 4 can remove the redundant object "e" around "family", so that only the target translation object "family" is retained. In this way, in subsequent recognition and translation, an interference caused by the redundant object "e" on the recognition and translation may be avoided, thereby further improving the speed and accuracy of translation.

As shown in FIGS. 9 and 12, the first processor 4 may determine the redundant object "e" by the following method: in the row direction C, determining an object whose distance from an origin E is greater than a first distance threshold s1 as the redundant object; and in a column direction D, determining an object whose distance from the origin E is greater than a second distance threshold s2 as the redundant object. The origin E is an intersection of the optical axis B of the lens of the image collector 5 and the paper surface, the first distance threshold s1 is a distance from the origin to a spacing area between columns of words, and the second distance threshold s2 is a distance from the origin to a spacing area between rows. The spacing area between columns refers to an area F between two adjacent words in the row direction C; the spacing area between rows refers to an area G between two adjacent words in the column direction D.

IV. intelligent prejudgment: a definition of the image of the target translation object is determined, and it is determined whether the definition meets an image definition required by text recognition of the target translation object in the image; if not, a signal for recollecting an image of the target translation object is sent.

For example, when the image collector 5 of the translation pen 100 collects the image of the target translation object, if the image of the target translation object collected by the image collector 5 is relatively blurred due to various factors (e.g., dark light, or shaking of the operator's hand during operation), the speed and accuracy of subsequent recognition will be affected. In order to eliminate this effect, the first processor 4 may further be configured to perform the following image preprocessing:

determining a magnitude of a first characteristic value of the definition of the image of the target translation object, and when the first characteristic value is less than a first preset value, sending a signal for re-shooting the image of the target translation object until the first processor 4 determines that the first characteristic value of the image of the target translation object is greater than or equal to the first preset value. In this way, through prejudgment of the first processor 4, an image with a definition meeting the requirement may be transmitted to the second processor 3, and problems of slow recognition speed and low recognition accuracy caused by unclear images are avoided, so that the translation pen 100 maintains a high recognition speed and accuracy, and the speed and accuracy of translation is further improved.

For example, the definition of the image of the target translation object may be characterized by a function value (i.e., the first characteristic value) of one of the following functions such as Brenner gradient function, Tenengrad gradient function, Laplacian gradient function, SMD (i.e., variance of gray scale) function, SMD2 (i.e., grayscale variance product) function, and the like.

V. splicing processing: in a case where the target translation object is a sentence which includes a plurality of sub-translation objects, images of the plurality of sub-translation objects in the sentence to be translated that are collected by the image collector 5 are preprocessed, and the preprocessed images are spliced.

Figure 13:
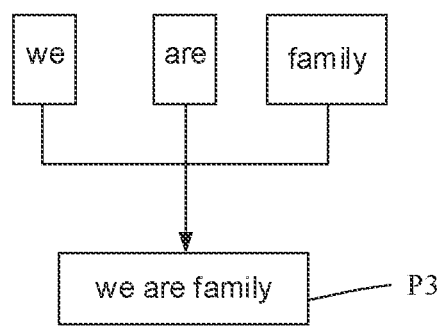
FIG. 13 is a schematic diagram illustrating a splicing processing performed by a first processor of a translation pen, in accordance with some embodiments of the present disclosure.

For example, as shown in FIG. 13, the target translation object is the sentence "we are family", the target translation object includes a plurality of sub-translation objects arranged in a certain sequence, and each sub-translation object is, for example, a word in the sentence. The image processor 5 is configured to collect images of the plurality of sub-translation objects and then transmit the images of the plurality of sub-translation objects to the first processor 4. The first processor 4 is configured to perform image preprocessing and splicing processing on the images of the plurality of sub-translation objects to form a third processed image P3 and transmit the third processed image P3 to the second processor 3.

For example, the first processor 4 may first splice the images of the plurality of sub-translation objects, and then perform image preprocessing of definition. The details are as follows.

The first processor 4 performs the following image preprocessing after performing the splicing processing on the images of the plurality of sub-translation objects: determining a magnitude of a second characteristic value of the definition of the images of the plurality of sub-translation objects after splicing, and when the second characteristic value is less than a second preset value, sending an electrical signal for re-shooting images of the plurality of sub-translation objects. The second characteristic value is a function value of a function (e.g., Brenner gradient function, Tenengrad gradient function, etc.) for characterizing the definition of the image of the target translation object.

For example, the first processor 4 may first perform image preprocessing of definition on the images of the plurality of sub-translation objects, and then perform the splicing processing on the images of the plurality of sub-translation objects whose definition meets the requirement. The details are as follows.

The image preprocessing of definition includes: determining a first characteristic value of a definition of an image of each sub-translation object after the images of the plurality of sub-translation objects are obtained, and when n is less than a third preset value, the image collector 5 sending a re-collecting electrical signal; n being the number of the images of the sub-translation objects whose first characteristic values are less than a fourth preset value.

The preprocessing operations such as tilt distortion correction, blank area removal, redundant object removal, intelligent prejudgment, splicing processing that can be performed by the first processor 4 have been exemplarily described above. In some embodiments of the present disclosure, the first processor 4 may perform one or more of the above preprocessing operations. For example, the first processor 4 performs a plurality of preprocessing operations, and the plurality of preprocessing operations may be performed sequentially, or several of the plurality of preprocessing operations may be performed sequentially, or the plurality of preprocessing operations may be performed simultaneously.

For example, the first processor 4 sequentially performs intelligent prejudgment, tilt distortion correction, blank area removal and redundant object removal on the image of the target translation object.

For another example, the first processor 4 first performs tilt distortion correction, blank area removal and redundant object removal on the image of the target translation object, and then performs intelligent prejudgment.

For yet another example, the first processor 4 may first perform tilt distortion correction, blank area removal and redundant object removal on the images of the plurality of sub-translation objects in the sentence to be translated that are collected by the image collector 5, and then perform the splicing processing on the preprocessed images.

For yet another example, the first processor 4 may first perform splicing processing on the images of the plurality of sub-translation objects in the sentence to be translated that are collected by the image collector 5, and then perform tilt distortion correction, blank area removal and redundant object removal on the spliced image.

According to different target translation objects (for example, the target translation object is a word or a character, or for another example, the target translation object is a sentence), an operator performs different operations when using the translation pen 100 accordingly. In some embodiments, when a word or a character needs to be translated, the operator can hold the translation pen 100 by hand and directly point on the word or the character to be translated, so that the image collector 5 may directly collect the image of the word or the character to be translated.

When a sentence needs to be translated, an operator can hold the translation pen 100 by hand, and then drive the translation pen 100 to move, so that the image collector 5 may scan and collect the images of the plurality of sub-translation objects (words, characters, letters, phrases, etc. of a sentence to be translated) in the target translation object (the sentence to be translated).

In response to the above requirements, a corresponding point translation mode and a scanning translation mode may be set in the first processor 4 or the second processor 3. For example, when it is detected that an action of the operator is to point on a word or a character to be translated, the target translation object is determined to be a word or a character, and the point translation mode is entered; when it is detected that the action of the operator is to drive the translation pen 100 to move on the paper surface, the target translation object is determined to be a sentence, and the scanning translation mode is entered.

In some embodiments, the translation pen 100 may also be fixed. In this case, the translation pen 100 further includes a driving device, and the image collector 5 is disposed on the driving device. The driving device can drive the image collector 5 to move, so as to collect the image of the target translation object.

Figure 4B:
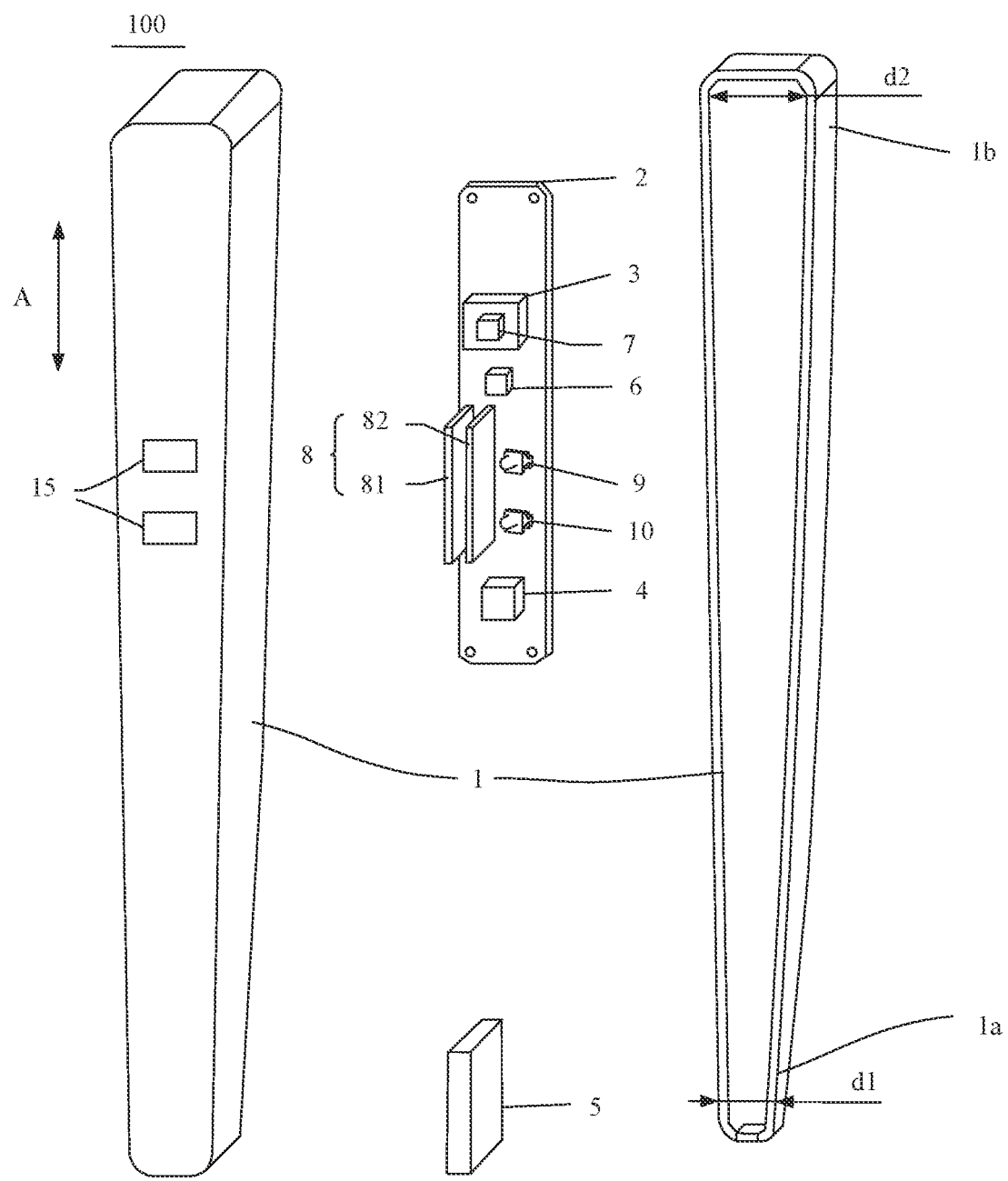
FIG. 4B is an exploded view of another translation pen.

In some embodiments, as shown in FIGS. 4A, 4B and 6, the translation pen 100 further includes a communication device 7 disposed in the pen body 1, and the communication device 7 is coupled to the second processor 3. The second processor 3 is further configured to control the communication device 7 to transmit the preprocessed image to a terminal device outside the translation pen 100. The communication device 7 is configured to transmit the preprocessed image to the terminal device under control of the second processor 3.

When the translation pen 100 is working, the image collector 5 of the translation pen 100 is moved above the target translation object, and then under the control of the second processor 3, the image collector 5 collects the image of the target translation object and transmits the collected image of the target translation object to the first processor 4. The first processor 4 is configured to perform image preprocessing on the image of the target translation object and transmit the preprocessed image to the second processor 3. And the second processor 3 controls the communication device 7 to transmit the preprocessed image to a terminal device 200, and the terminal device 200 recognizes the target translation object in the received preprocessed image, and then translates the recognized target translation object into a preset language text.

In some embodiments, the communication device 7 is provided separately from the second processor 3. In the extending direction A from the pen tip 1a to the pen tail 1b of the pen body 1, the communication device 7 is disposed at a side of the second processor 3 proximate to or away from the pen tail 1b of the pen body 1. By providing the communication device 7 separately from the second processor 3, the encapsulation volume of the second processor 3 is further reduced.

For example, as shown in FIG. 4A, in the extending direction A from the pen tip 1a to the pen tail 1b of the pen body 1, the communication device 7 is disposed at a side of the second processor 3 away from the pen tail 1b of the pen body 1.

In some embodiments, as shown in FIG. 4B, the communication device 7 is provided integrally with the second processor 3.

Figure 14:
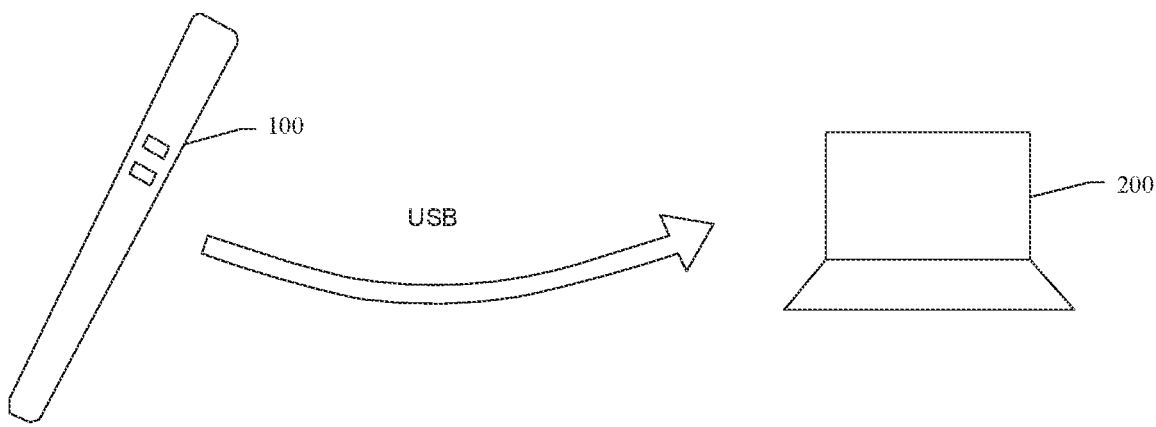
FIG. 14 is a schematic diagram illustrating wired transmission of a translation pen and a terminal device, in accordance with some embodiments of the present disclosure.
Figure 15:
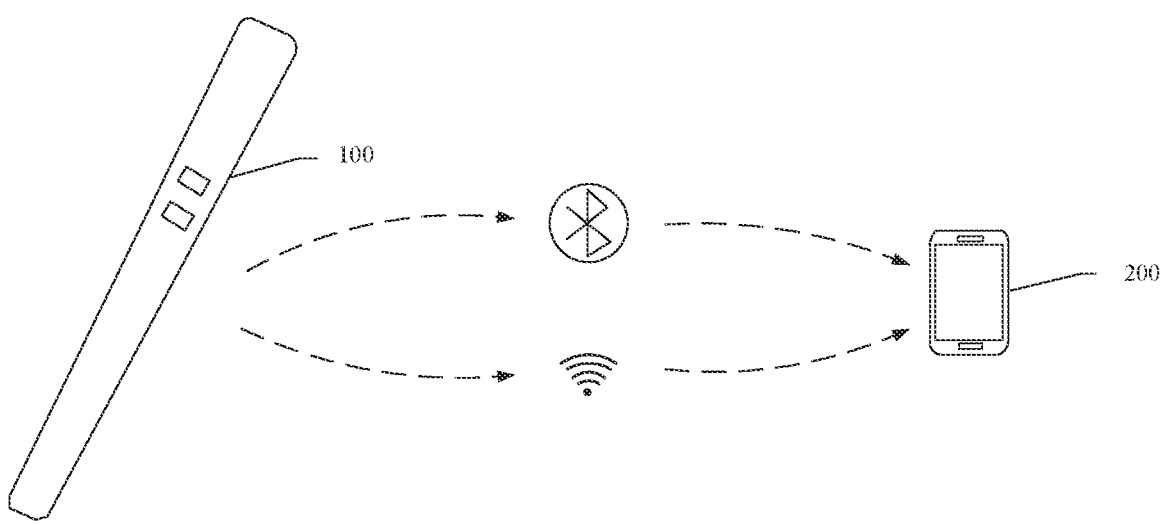
FIG. 15 is a schematic diagram illustrating wireless transmission of a translation pen and a terminal device, in accordance with some embodiments of the present disclosure.

In some embodiments, as shown in FIG. 14, the communication device 7 includes an interface for coupling the terminal device 200, such as a universal serial bus (abbreviated as USB) interface, through which the preprocessed image is transmitted to the terminal device 200. Or as shown in FIG. 15, the communication device 7 includes a Wi-Fi circuit or a bluetooth circuit, and the preprocessed image is transmitted to the terminal device 200 by utilizing the Wi-Fi circuit or the bluetooth circuit.

In some embodiments, as shown in FIGS. 4A and 6, the translation pen 100 further includes a power supply 6 and a memory 8 which are disposed in the pen body 1. The power supply 6 and the memory 8 are both coupled to the second processor 3.

For example, the memory 8 includes a double data rate synchronous dynamic random access memory 81 (abbreviated as DDR SDRAM) and a flash memory 82. The DDR SDRAM 81 is coupled to the second processor 3 through a DDR bus, and the flash memory 82 is coupled to the second processor 3 through a flash interface. The DDR SDRAM 81 is configured to randomly access data during program operation; the flash memory 82 is configured to hold written information in a case where the translation pen 100 is powered down, so that the second processor 3 is able to read information from the memory 8 and write information to the memory 8.

The power supply 6 and the memory 8 may be provided integrally with the second processor 3, or may be provided separately from the second processor 3.

In some embodiments, as shown in FIG. 4A, the translation pen 100 further includes a circuit board 2 disposed in the pen body 1. The first processor 4, the second processor 3, the communication device 7, the power supply 6, the DDR SDRAM 81 and the flash memory 82 may all be disposed on the circuit board 2.

For example, the circuit board 2 is in a strip shape, and an extending direction of the strip shape is in the extending direction from the pen tip 1a to the pen tail 1b of the pen body 1, so as to adapt to an internal profile of the pen body 1, reduce an occupied volume of the circuit board 2 inside the pen body 1, and improve a utilization rate of space in the pen body 1, thereby facilitating the realization of the overall miniaturization design of the translation pen 100.

In some embodiments, as shown in FIGS. 4A and 6, the translation pen 100 further includes a switch indicator light 9 connected to the second processor 3, and the switch indicator light 9 is turned on when the translation pen 100 is in a working state to indicate the working state of the translation pen 100. The switch indicator light 9 may be a light-emitting diode (abbreviated as LED) indicator light.

In some embodiments, as shown in FIGS. 4A and 6, the translation pen 100 further includes a translation recognition indicator light 10 connected to the second processor 3, and the translation recognition indicator light 10 is configured to indicate a state of translation recognition. When translation is successful, the translation recognition indicator light 10 displays a first color, such as green, and when translation fails, the translation recognition indicator light 10 displays a second color, such as red. The translation recognition indicator light 10 may be a LED indicator light.

For example, the pen body 1 of the translation pen 100 is provided with windows 15 facing the switch indicator light 9 and the translation recognition indicator light 10, so as to expose the switch indicator light 9 and the translation recognition indicator light 10 on the pen body 1, thereby facilitating the operator to observe color change of the lights.

Some embodiments of the present disclosure also provide a translation system 300. As shown in FIGS. 14 and 15, the translation system 300 includes a terminal device 200 and the translation pen 100. The translation pen 100 further includes a communication device 7 disposed in the pen body 1 of the translation pen 100, and the second processor 3 of the translation pen 100 is connected to the terminal device 200 in a wired or wireless manner through the communication device 7.

When the translation system 300 is working, as shown in FIG. 16, the image collector 5 of the translation pen 100 is moved above the target translation object, and then under the control of the second processor 3, the image collector 5 collects the image of the target translation object at S01 and transmits the collected image of the target translation object to the first processor 4. The first processor 4 is configured to perform image preprocessing on the image of the target translation object at S02 and transmit the preprocessed image to the second processor 3. The second processor 3 controls the communication device 7 to transmit the preprocessed image to the terminal device 200 at S03, and the terminal device 200 recognizes the target translation object in the received preprocessed image, and then translates the recognized target translation object into a preset language text at S04.

For example, the communication device 7 transmits the preprocessed image to the terminal device 200 under the control of the second processor 3. For example, the communication device 7 may use a USB interface to transmit the preprocessed image to the terminal device 200. Or the communication device 7 may use a Wi-Fi circuit or a bluetooth circuit to transmit the preprocessed image to the terminal device 200.

For example, the terminal device 200 may be a mobile phone, a tablet computer, a computer, etc., and the present disclosure is not limited thereto. The terminal device 200 may recognize the target translation object in the received preprocessed image through recognition software, and then translate the target translation object into a preset language text through translation software.

For example, the terminal device 200 may also pronounce to broadcast the translated preset language text after the translation is completed.

The translation system 300 includes the terminal device 200 and the translation pen 100, and by adopting a manner in which the image collector 5, the first processor 4 and the second processor 3 are arranged in sequence in the extending direction from the pen tip 1a to the pen tail 1b of the pen body 1, and separately arranging and individually encapsulating the first processor 4 and the second processor 3, the encapsulation volume of the second processor 3 may be reduced, thereby reducing an inner diameter of each part of the pen body 1 in the extending direction from the pen tip 1a to the pen tail 1b of the pen body 1, realizing the overall miniaturization design of the translation pen 100, and further realizing an overall miniaturization design of the translation system 300.

In addition, the translation system 300 may perform high frame rate processing (60 frames per second), and may realize rapid scanning without losing images in the translation process, thereby ensuring a fast and accurate translation process. Moreover, the first processor 4 in the translation system 300 may perform any one or more of the preprocessing operations such as tilt distortion correction, blank area removal, redundant object removal, intelligent prejudgment and splicing processing simultaneously, and complete a processing feedback within 60 milliseconds, which improves the processing efficiency of the image of the target translation object, and further ensures the translation speed.

The forgoing descriptions are merely specific implementations of the present disclosure, but the protection scope of the present disclosure is not limited thereto. Any change or replacement that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A translation pen, comprising:
a pen body; and
an image collector, a first processor and a second processor that are disposed in the pen body, wherein
the image collector, the first processor and the second processor are arranged in sequence in an extending direction from a pen tip to a pen tail of the pen body, and are sequentially coupled to one another;
the image collector is configured to collect an image of a target translation object and transmit the image of the target translation object to the first processor;
the first processor is configured to preprocess the image of the target translation object and transmit the preprocessed image to the second processor; and
the second processor is configured to control the image collector to collect the image of the target translation object and control the first processor to preprocess the image of the target translation object.

2. The translation pen according to claim 1, wherein an inner diameter of the pen tip is less than an inner diameter of the pen tail;
the image collector is disposed in the pen tip;
the second processor is disposed in the pen body and is closer to the pen tail than the image collector; and
the first processor is disposed in the pen body and is located between the image collector and the second processor.

3. The translation pen according to claim 2, further comprising:
a communication device disposed in the pen body, the communication device being coupled to the second processor, wherein
the second processor is further configured to control the communication device to transmit the preprocessed image to a terminal device outside the translation pen; and
the communication device is configured to transmit the preprocessed image to the terminal device under control of the second processor, so that the terminal device translates texts contained in the preprocessed image.

4. The translation pen according to claim 2, wherein the first processor is configured to perform at least one of:
performing tilt distortion correction on the image of the target translation object;
determining a target area where the target translation object is located in the image of the target translation object and a blank area around the target area, and removing the blank area;
determining a redundant object around the target translation object in the image of the target translation object, and removing the redundant object;
determining a definition of the image of the target translation object; determining whether the definition meets an image definition required by text recognition of the target translation object in the image; and if not, sending a signal for recollecting an image of the target translation object; and
the target translation object being a sentence which includes a plurality of sub-translation objects, preprocessing images of the plurality of sub-translation objects in the sentence to be translated that are collected by the image collector, and performing splicing processing on the preprocessed images.

5. The translation pen according to claim 1, wherein the first processor has a mobile industry processor interface (MIPI) and a low voltage differential signaling (LVDS) interface;
the image collector is coupled to the first processor through the MIPI interface; and
the second processor is coupled to the first processor through the LVDS interface.

6. The translation pen according to claim 1, wherein the first processor includes one of a field programmable gate array device, a digital signal processor, and an application specific integrated circuit chip.

7. The translation pen according to claim 1, further comprising:

a communication device disposed in the pen body, the communication device being coupled to the second processor, wherein the second processor is further configured to control the communication device to transmit the preprocessed image to a terminal device outside the translation pen; and the communication device is configured to transmit the preprocessed image to the terminal device under control of the second processor, so that the terminal device translates texts contained in the preprocessed image.

8. The translation pen according to claim 7, wherein the communication device is provided separately from the second processor; in the extending direction from the pen tip to the pen tail of the pen body, the communication device is disposed at a side of the second processor proximate to or away from the pen tail; or the communication device is provided integrally with the second processor.

9. The translation pen according to claim 7, wherein the communication device includes an interface for coupling the terminal device; or the communication device includes a Wi-Fi circuit or a bluetooth circuit.

10. The translation pen according to claim 1, wherein the first processor is in a shape of a cuboid, and side lengths thereof are in a range from 6 mm to 10 mm; and the second processor is in a shape of a cuboid, and side lengths thereof are in a range from 8 mm to 12 mm.

11. The translation pen according to claim 10, wherein a length of the pen body is in a range from 128 mm to 132 mm in the extending direction from the pen tip to the pen tail of the pen body; and an inner diameter of the pen tip is in a range from 8 mm to 12 mm, and an inner diameter of the pen tail is in a range from 13 mm to 17 mm.

12. The translation pen according to claim 1, further comprising a power supply and a memory that are disposed in the pen body; and the power supply and the memory are both coupled to the second processor.

13. The translation pen according to claim 1, further comprising a circuit board disposed in the pen body, wherein the circuit board is in a strip shape, and an extending direction of the strip shape is in the extending direction from the pen tip to the pen tail of the pen body; and the first processor and the second processor are disposed on the circuit board.

14. The translation pen according to claim 1, wherein the first processor is configured to perform at least one of:

performing tilt distortion correction on the image of the target translation object;

determining a target area where the target translation object is located in the image of the target translation object and a blank area around the target area, and removing the blank area;

determining a redundant object around the target translation object in the image of the target translation object, and removing the redundant object;

determining a definition of the image of the target translation object; determining whether the definition meets an image definition required by text recognition of the target translation object in the image; and if not, sending a signal for recollecting an image of the target translation object; and the target translation object being a sentence which includes a plurality of sub-translation objects, preprocessing images of the plurality of sub-translation objects in the sentence to be translated that are collected by the image collector, and performing splicing processing on the preprocessed images.

15. The translation pen according to claim 1, further comprising:

a switch indicator light connected to the second processor, the switch indicator light being configured to indicate a working state of the translation pen.

16. The translation pen according to claim 15, further comprising:

a translation recognition indicator light connected to the second processor, the translation recognition indicator light being configured to indicate a state of translation recognition.

17. The translation pen according to claim 16, wherein the pen body of the translation pen is provided with windows exposing the switch indicator light and the translation recognition indicator light.

18. A translation system, wherein the translation system comprises:

the translation pen according to claim 1; and a terminal device wirelessly or wiredly coupled to the translation pen, wherein the terminal device is configured to perform text recognition on the target translation object in the preprocessed image from the translation pen and translate the recognized text into a preset language text.

* * * * *